US006801171B2

(12) United States Patent
Lien

(10) Patent No.: US 6,801,171 B2
(45) Date of Patent: Oct. 5, 2004

(54) ANTENNA ASSEMBLY AND WIRELESS COMMUNICATION DEVICE

(75) Inventor: Tai Tung Lien, MiaoLi (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 10/364,339

(22) Filed: Feb. 12, 2003

(65) Prior Publication Data

US 2004/0155822 A1 Aug. 12, 2004

(51) Int. Cl.$^{7}$ .............................. H01Q 1/24; H04B 1/38
(52) U.S. Cl. .......................................... 343/702; 455/90
(58) Field of Search .......................... 343/702, 700 MS, 343/872, 846, 848; 455/90

(56) References Cited

U.S. PATENT DOCUMENTS 6,215,454 B1 * 4/2001 Tran ........................... 343/841
6,353,414 B1 * 3/2002 Jones et al. .................. 343/702
6,388,627 B1 * 5/2002 Masaki et al. .............. 343/702
6,501,429 B2 * 12/2002 Nakamura et al. .......... 343/702

* cited by examiner

*Primary Examiner*—James Vannucci
*Assistant Examiner*—Minh Dieu A
(74) *Attorney, Agent, or Firm*—Birch, Stewart, Kolasch & Birch, LLP

(57) ABSTRACT

An antenna assembly and a wireless communication device of the invention are disclosed. The wireless communication device includes a casing, an antenna body, a rotary assembly, and a moving member. The antenna body is mounted in a concave portion of the casing for generating electromagnetic signals. The antenna body is rotated at a predetermined angle. The rotary assembly, connected to the antenna body, rotates the antenna body. The moving member, mounted on the casing, immobilizes or releases the antenna body. Therefore, users can rotate the antenna body simply by moving the moving member.

13 Claims, 5 Drawing Sheets

ANTENNA ASSEMBLY AND WIRELESS COMMUNICATION DEVICE

BACKGROUND OF THE INVENTION

1. Field of the Invention

The invention relates to a wireless communication device; in particular, a wireless communication device with an automatic antenna assembly.

2. Description of the Related Art

Wireless communication devices, such as wireless bridges, are more and more popular, providing many conveniences. In the wireless communication device, an antenna is a necessary unit.

In the conventional wireless communication device, the antenna is manually rotated to a predetermined position. However, it is a very inconvenient operation for the user.

In addition, since the wireless communication device is a hi-tech product, the manual rotation does not match its image.

SUMMARY OF THE INVENTION

In order to address the disadvantages of the aforementioned wireless communication device, the invention provides a wireless communication device with an automatic antenna assembly.

The invention provides a wireless communication device, including a casing, an antenna body, a rotary assembly, and a moving member. The antenna body is mounted in a concave portion of the casing for generating electromagnetic signals. The antenna body is rotated at a predetermined angle. The rotary assembly, connected to the antenna body, rotates the antenna body. The moving member, mounted on the casing, immobilizes or releases the antenna body.

In a preferred embodiment of the invention, the antenna body includes a first hole mounted at a front end of the antenna body such that when a first protrusion of the moving member is inserted into the first hole, the antenna body is immobilized, and when the first protrusion of the moving member is disengaged from the first hole, the antenna body is released.

In another preferred embodiment of the invention, the rotary assembly includes a rotating member and a sleeve such that the rotating member is engaged with the antenna body and the sleeve is engaged with the rotating member respectively.

Furthermore, the rotating member includes a groove, and the sleeve includes a bending portion inserted into the groove, so the antenna body is rotated at the predetermined angle when the antenna body via the rotating member deforms the bending portion.

Furthermore, the rotating member includes a first hollow portion and a second protrusion. Thus, the first hollow portion is received the bending portion, and the second protrusion is inserted into a second hole of the antenna body.

Furthermore, the rotating member and the sleeve are received into a second hollow portion of the antenna body.

In another preferred embodiment, the predetermined angle is approximately 90 degree.

The invention also provides an antenna assembly for a wireless communication device. The antenna assembly includes an antenna body, a rotary assembly, and a moving member. The antenna body, having a first hole, generates electromagnetic signals, and rotates at a predetermined angle. The rotary assembly is connected to the antenna body for rotating the antenna body. The moving member, having a first protrusion, immobilizes or releases the antenna body. Thus, the antenna body is immobilized when the first protrusion is inserted into the first hole, and the antenna body is released when the first protrusion is disengaged from the first hole.

BRIEF DESCRIPTION OF THE DRAWINGS

The invention is hereinafter described in detail with reference to the accompanying drawings in which.

DETAILED DESCRIPTION OF THE INVENTION

Figure 1A:
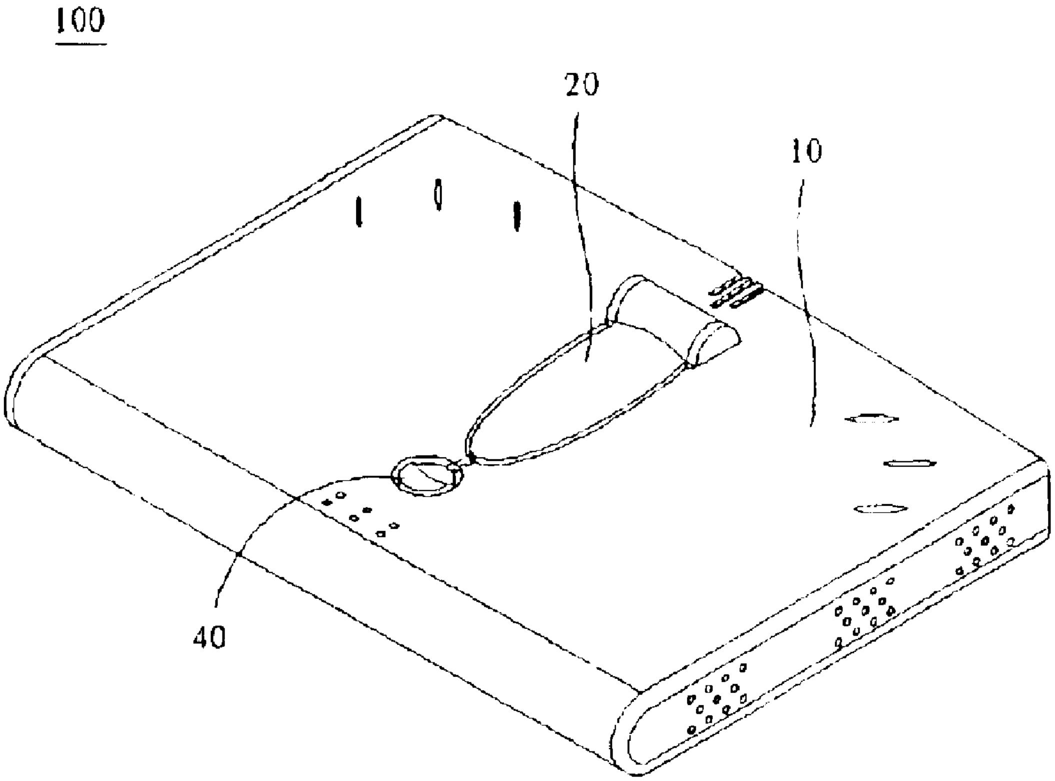
FIG. 1*a* is a schematic view of a wireless communication device as disclosed in the embodiment, wherein an antenna body is located at a first position, and a moving member is located at a third position.
Figure 2A:
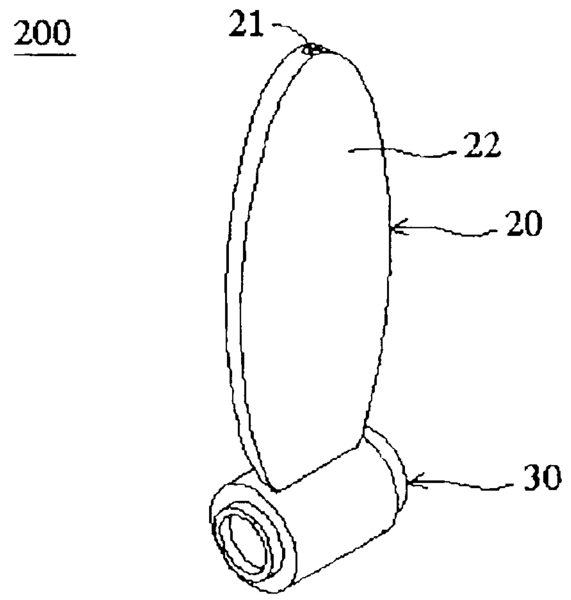
FIG. 2*a* is a schematic view of an antenna assembly in FIG. 1*a;*
Figure 2B:
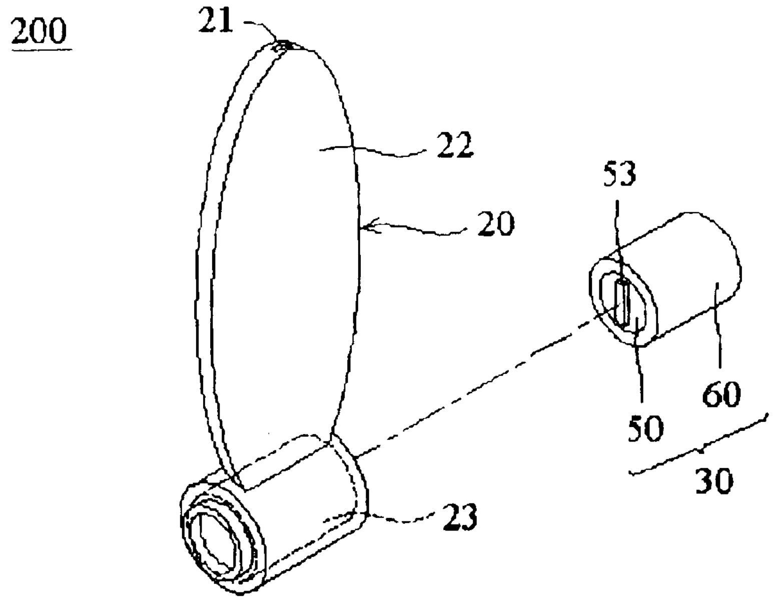
FIG. 2*b* is another schematic view of the antenna assembly, wherein the antenna body and a rotary assembly are separated.
Figure 2C:
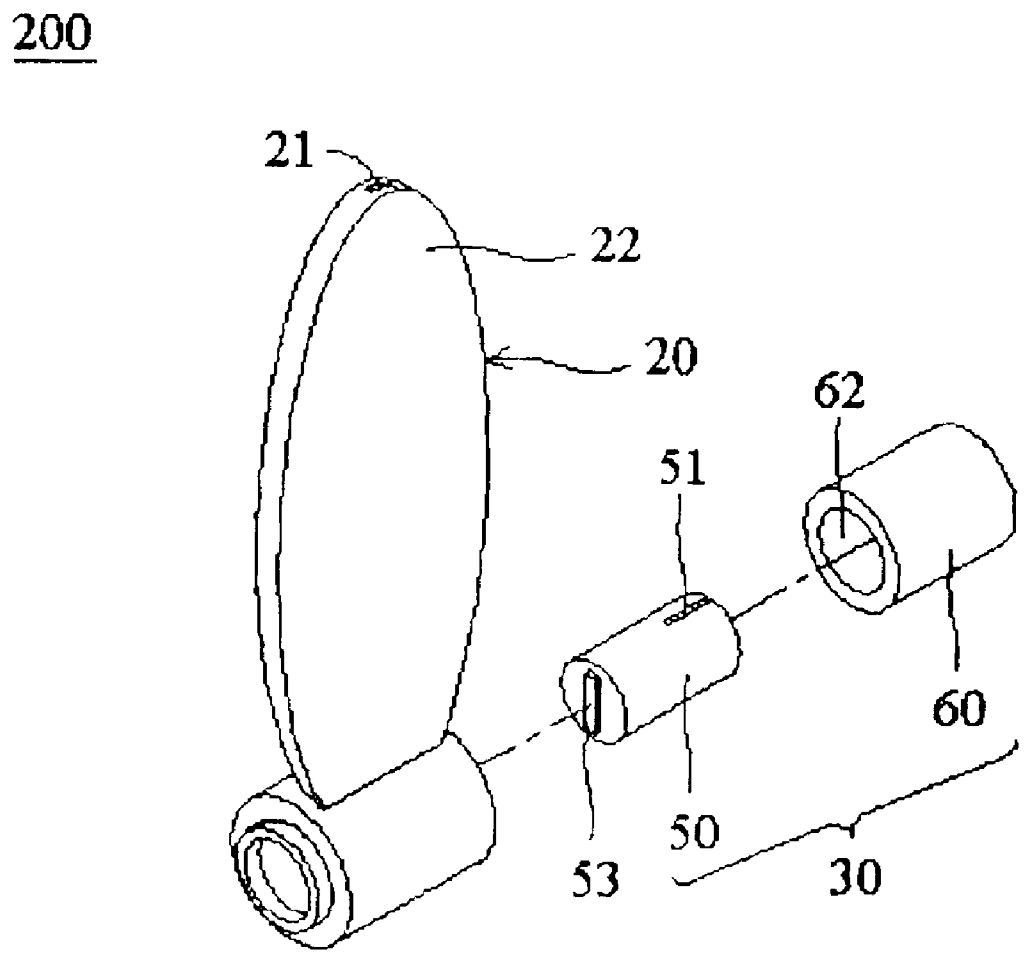
FIG. 2*c* is another schematic view of the antenna assembly, wherein a sleeve and a rotating member are separated.

Referring to FIG. 1*a* and FIG. 2*b*, a wireless communication device 100, as disclosed in the embodiment of the invention, includes a casing 10, an antenna body 20, a rotary assembly 30, and a moving member 40. An antenna assembly 200, as disclosed in the embodiment, includes an antenna body 20, a rotary assembly 30, and a moving member 40.

The casing 10 is a basic unit of the wireless communication device 100, and includes required devices of the wireless communication device 100 therein. Since the required devices are the same as those of the conventional wireless communication device, their description is omitted. In addition, the casing 10 includes a concave portion 11 for receiving the antenna body 20.

Figure 1B:
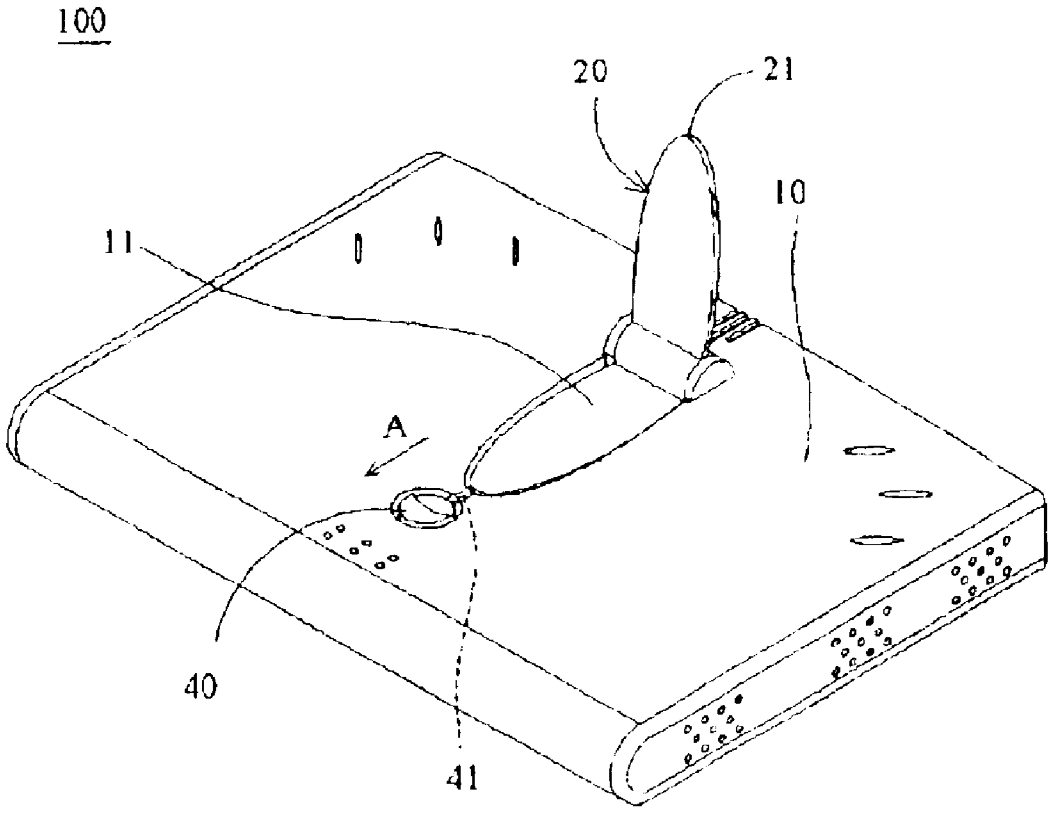
FIG. 1*b* is another schematic view of a wireless communication device as disclosed in the invention, wherein the antenna body is located at a second position, and the moving member is located at a fourth position.

The antenna body 20 is a transmission interface between the wireless communication device 100 and the environment, generating and transmitting electromagnetic signals. The antenna body 20 is mounted on the casing 10 in a manner such that the antenna body 20 is rotated between a lowered position (as shown in FIG. 1*a* and hereinafter referred to as a first position) and an upright position (as shown in FIG. 1*b* and hereinafter referred to as a second position). That is, the antenna body 20 is rotated at a predetermined angle. For example, the predetermined angle is approximately at a range of 90 degree but not limited to 90 degree. Referring to FIG. 2*b*, the antenna body 20 includes a first hole 21, a main portion 22, and a second hollow portion 23. The first hole 21 is formed at a front end of the antenna body 20. When the antenna body 20 is located at the first position, the main portion 22 is located in the concave portion 11 of the casing 10. Furthermore, the rotary assembly 30 is received into the second hollow portion 23.

The moving member 40 is used for immobilizing or releasing the antenna body 20. The moving member 40 is mounted on the casing 10 in a manner such that it is rotated between an engagement position (as shown in FIG. 1*a* and hereinafter referred to as a third position) and a separation position (as shown in FIG. 1*b* and hereinafter referred to as a fourth position). The moving member 40 includes a first protrusion 41 to be inserted into the first hole 21 of the antenna body 20. Thus, when the moving member 40 is located at the third position, the first protrusion 41 is inserted into the first hole 21 to immobilize the antenna body 20 at the first position. Furthermore, when the moving member 40 is located at the fourth position, the first protrusion 41 is disengaged from the first hole 21, and therefore the antenna body 20 is released and rotated round the rotary assembly 30 toward the second position.

The rotary assembly 30 is disposed in the casing 10, and is connected with the antenna body 20 to rotate the antenna body 20 as shown in FIG. 2*a*. Referring to FIG. 2*a*, FIG. 2*b*, FIG. 2*c*, FIG. 3*a*, and FIG. 3*b*, the rotary assembly 30 includes a rotating member 50 and a sleeve 60.

The rotating member 50 includes a groove 51, a first hollow portion 52, and a second protrusion 53. The second protrusion 53 is inserted into the second hole 24 of the antenna body 20 so that the rotating member 50 is combined with the antenna body 20 and is rotated along with the antenna body 20.

The sleeve 60 is disposed in the second hollow portion 23 of the antenna body 20, and is fixed in the casing 10 at one end. The sleeve 60 includes a bending portion 61 and a third hollow portion 62. The bending portion 61 is integrally formed on the sleeve 60. When the sleeve 60 is combined with the rotating member 50, the bending portion 61 is received in the first hollow portion 52 of the rotating member 52, and an end portion 611 of the bending portion 61 is located in the groove 51 of the rotating member 50, and the whole rotating member 50 is received in the third hollow portion 62.

Figure 3A:
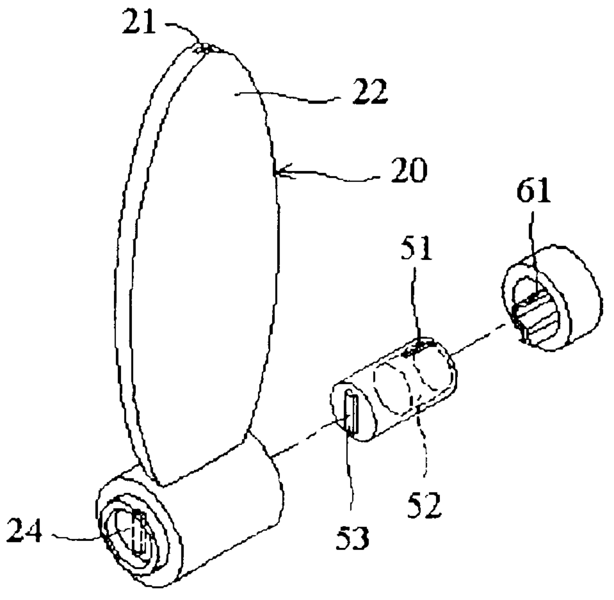
FIG. 3*a* is another schematic view of the antenna assembly, wherein the sleeve is partially cut.
Figure 3B:
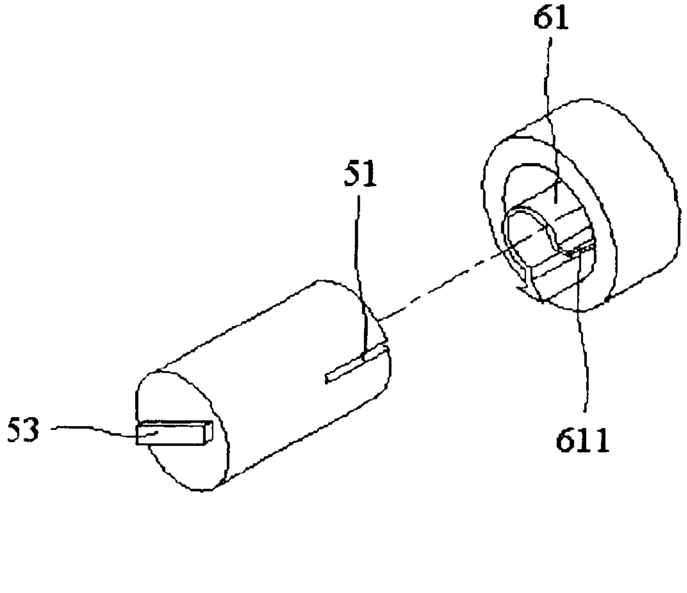
FIG. 3*b* is a schematic view of the sleeve and the rotating member in FIG. 2*c*, wherein a bending portion of the sleeve is deformed.

As stated above, when the moving member 40 is located at the third position, the antenna body 20 via the rotating member 50 deforms the bending portion 61 of the sleeve 60. At this time, the bending portion 61 forms a 270-degree arc as shown in FIG. 3*b*. When the moving member 40 is located at the fourth position, the bending portion 61 is released. At this time, the bending portion 61 forms a 180-degree arc as shown in FIG. 3*a* to rotate the antenna body 20 to the second position via the rotating member 50.

It is noted that the bending portion 61 is made of elastic material; therefore, when the bending portion 61 is subjected to external force, it is deformed.

It is understood that the antenna body 20 is provided with flush lubricating material in the second hollow portion 23 to allow smooth rotation of the sleeve 60, and the sleeve 60 is also provided with flush lubricating material in the third hollow portion 62 to allow smooth rotation of the rotating member 50. Therefore, the antenna body 20 rotates smoothly.

Before the antenna body 20 is raised, the moving member 40 is moved toward a direction as shown in an arrow A of FIG. 1*b*. Then, the first protrusion 41 of the moving member 40 is disengaged from the first hole 21 of the antenna body 20. So, the bending portion 61 of the sleeve 60 of the rotary assembly 30 is released to rotate the antenna body 20 to the second position via the rotating member 50.

When the raised-up antenna body 20 is pressed down, the first protrusion 41 of the moving member 40 is inserted into the first hole 21 of the antenna body 20. Thus, the antenna body 20 is returned to the casing 10.

As stated above, the user can raise the antenna body 20 simply by moving the moving member 40; thus, it is more convenient than rotating the antenna body manually.

Furthermore, since the main portion 22 of the antenna body 20 can be disposed in the concave portion 11 of the casing 10, the appearance of the wireless communication device 100 is neater and more appealing.

It is noted that the design of the antenna assembly of the wireless communication device as disclosed in the embodiment is also applicable to wireless bridge and others.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A network device for wireless communication comprising:

a casing;

an antenna body mounted in a concave portion of said casing for generating and transmitting electromagnetic signals, wherein said antenna body is rotated at a predetermined angle;

a rotary assembly connected to said antenna body for rotating said antenna body; and a moving member mounted on said casing for immobilizing or releasing said antenna body.

2. The network device as recited in claim 1, wherein said antenna body comprises a first hole mounted at a front end of the antenna body such that when a first protrusion of the moving member inserted into the first hole, the antenna body is immobilized, and when the first protrusion of the moving member is disengaged from the first hole, the antenna body is released.

3. The network device as recited in claim 1, wherein said predetermined angle is approximately at a range of 0 to 90 degree.

4. A wireless communication device comprising:

a casing;

an antenna body mounted in a concave portion of said casing for generating and transmitting electromagnetic signals, wherein said antenna body is rotated at a predetermined angle;

a rotary assembly connected to said antenna body for rotating said antenna body, wherein said rotary assembly comprises a rotating member and a sleeve that said rotating member is engaged with said antenna body and said sleeve is engaged with the rotating member respectively; and a moving member mounted on said casing for immobilizing or releasing said antenna body.

5. The network device for wireless communication as recited in claim 4, wherein said rotating member comprises a groove and said sleeve, said sleeve comprising a bending portion inserted into said groove such that said antenna body is rotated to said predetermined angle when said antenna body via said rotating member deforms said bending portion.

6. The network device for wireless communication as recited in claim 4, wherein said rotating member comprises a first hollow portion and a second protrusion, whereby said first hollow portion is received said bending portion and the second protrusion is inserted into a second hole of the antenna body.

7. The network device for wireless communication as recited in claim 4, wherein said rotating member and said sleeve are received into a second hollow portion of the antenna body.

8. An antenna assembly, for used in a network device for wireless communication, comprising:

an antenna body having a first hole for generating and transmitting electromagnetic signals, wherein said antenna body is rotated to a predetermined angle;

a rotary assembly connected to said antenna body for rotating said antenna body; and a moving member for immobilizing or releasing said antenna body, providing a first protrusion, whereby said antenna body is immobilized when said first protrusion is inserted into said first hole and said antenna body is released when said first protrusion is disengaged from said first hole.

9. The antenna assembly as recited in claim 8, wherein said predetermined angle is approximately at a range of 0 to 90 degree.

10. An antenna body having a first hole for generating and transmitting electromagnetic signals, wherein said antenna body is rotated to a predetermined angle;

a rotary assembly connected to said antenna body for rotating said antenna body, wherein said rotary assembly comprises a rotating member and a sleeve, said sleeve having a bending portion and a third hollow portion, whereby said sleeve is engaged with said rotating member and said rotating member is engaged with said antenna body; and a moving member for immobilizing or releasing said antenna body, providing a first protrusion, whereby said antenna body is immobilized when said first protrusion is inserted into said first hole and said antenna body is released when said first protrusion is disengaged from said first hole.

11. The antenna assembly as recited in claim 10, wherein said rotating member comprises a groove, a first hollow portion, and a second protrusion, whereby said groove and said first hollow portion are inserted by the bending portion such that said antenna body via said rotating member deforms said bending portion when said antenna body is rotated to said predetermined angle, and said second protrusion is inserted into a second hole of said rotary assembly.

12. The antenna assembly as recited in claim 10, wherein said rotating member and said sleeve are inserted into a second hollow portion of said antenna body.

13. The antenna assembly as recited in claim 10, wherein said third hollow portion of said sleeve comprises a or smoothing said rotating member.

* * * * *